United States Patent [19]
Lauto

[11] Patent Number: 5,427,394
[45] Date of Patent: Jun. 27, 1995

[54] MODULAR SHOPPING CART

[75] Inventor: William J. Lauto, Jericho, N.Y.

[73] Assignee: B and B Ventures, Inc., Hicksville, N.Y.

[21] Appl. No.: 33,183

[22] Filed: Mar. 16, 1993

[51] Int. Cl.6 .............................................. B62B 3/02
[52] U.S. Cl. ............................ 280/47.35; 280/33.998
[58] Field of Search ...................... 280/33.998, 47.371, 280/47.34, 47.35, 47.36, 638, 79.11, 79.2, 79.3

[56] References Cited

U.S. PATENT DOCUMENTS

| | | | |
|---|---|---|---|
| 1,707,186 | 3/1929 | Chatfield | 280/658 |
| 2,372,372 | 3/1945 | Faure | 280/51 |
| 3,087,740 | 4/1963 | Mitty et al. | 280/47.26 |
| 3,118,553 | 1/1964 | Rosenzweig | 214/501 |
| 3,279,811 | 10/1966 | Mitty et al. | 280/47.26 |
| 3,346,271 | 10/1967 | Parsons | 280/33.991 |
| 3,460,850 | 8/1969 | Franklin | 280/47.2 |
| 3,523,694 | 8/1970 | Oliver | 280/33.998 |
| 3,774,929 | 11/1973 | Stanley | 280/DIG. 4 |
| 3,827,708 | 8/1974 | Derry | 280/657 |
| 4,109,926 | 8/1978 | Lane | 280/42.34 |
| 4,248,442 | 2/1981 | Barrett | 280/33.998 |
| 4,268,049 | 5/1981 | Salvador | 280/47.35 |
| 4,492,388 | 1/1985 | de Wit | 280/651 |
| 4,632,412 | 12/1986 | Nasgowitz | 280/47.26 |
| 4,923,202 | 5/1990 | Breveglieri et al. | 280/47.35 |

OTHER PUBLICATIONS

"Office Products 1993", Agnew–Geisler, p. 275.
"Walk, Shop and Rest!", Dr. Leonard's Health Care Catalog, 1993.
"3 Tier Stacking Cart on Wheels", Pergament Advertisement, Mar. 1993.

Primary Examiner—Richard M. Camby
Attorney, Agent, or Firm—Dilworth & Barrese

[57] ABSTRACT

A modular material carrying vehicle is provided preferably for use as a shopping cart having a plurality of separable storage compartments including a lower storage compartment and at least one upper storage compartment stackable upon the lower storage compartment. The storage compartments are each releasably maintained in an upright stacked configuration by a pair of elongated tubular structural support members.

14 Claims, 4 Drawing Sheets

MODULAR SHOPPING CART

BACKGROUND OF THE INVENTION

1. Field of the Invention

This invention relates to material carrying vehicles and more particularly to a shopping cart having modular storage compartments which are separable from one another to facilitate transportation of goods contained therein.

2. Description of the Related Art

In supermarkets, shoppers typically collect and carry items for purchase in a shopping cart provided by the store. These shopping carts are relatively expensive to purchase and often occupy valuable floor space when they are not in use. Often, shopping cans are the object of theft and loss since shoppers are commonly permitted to wheel them to their automobiles to unload their groceries.

Attempts have been made to reduce the need for store-owned shopping carts. An example of an early user-owned shopping cart is disclosed in U.S. Pat. No. 3,118,553 which issued to Rosenzweig. This shopping cart includes a removable basket and a collapsible frame assembly. It is limited however, in its capacity to carry a significant amount of goods, and the frame assembly can be cumbersome to transport since it is fabricated from tubular steel. Later attempts at providing a user-owned shopping cart are described in U.S. Pat. No. 3,774,929 which issued to Stanley, and U.S. Pat. No. 4,492,388 which issued to de Wit.

Still another expense associated with supermarket management, is the provision of grocery bags which enable shoppers to transport their purchased items from the supermarket to their homes. Many supermarkets offer shoppers both plastic bags and craft paper bags to carry their groceries. In addition to the costs associated with providing shopping bags, their disposal puts pressure upon waste management facilities, thus adversely effecting our environment.

In view of the cost and disadvantages facing supermarket owners and shoppers, it is an object of the subject invention to provide a shopping cart which can be owned by the customer, and brought to and from the market and used therein, with sufficient capacity to carry a large number of items for purchase.

It is a further object of the subject invention to provide a user-owned shopping cart having several modular compartments which are separable from one another so as to enable a shopper to carry purchased items from the supermarket without the need of shopping bags of any type.

It is still another object of the subject invention to provide a user-owned modular shopping cart which is inexpensive to manufacture.

SUMMARY OF THE INVENTION

A modular material carrying vehicle is provided which comprises a lower storage structure defining a bottom panel, opposed upstanding side panels, and opposed upstanding front and rear panels, means associated with the bottom panel of the lower storage structure for effectuating movement of the vehicle over a supporting surface, at least one upper storage structure stackable upon the lower storage structure and defining opposed upstanding side panels, and opposed upstanding front and rear panels, and means for releasably maintaining the lower storage structure and the upper storage structure in an upright stacked configuration.

In a preferred embodiment of the subject invention, the modular material carrying vehicle defines a modular shopping cart which comprises a lower storage structure defining a bottom panel and at least two parallel upstanding panels, a plurality of casters associated with the bottom panel of the lower storage structure for effectuating movement of the shopping cart over a supporting surface, at least one upper storage structure defining a bottom panel, opposed upstanding side panels and opposed upstanding front and rear panels, and means for releasably maintaining the lower storage structure and at least one upper storage structure in an upright stacked configuration.

Preferably, the means for releasably maintaining the lower storage structure and at least one upper storage structure in an upright stacked configuration comprises a pair of tubular support members dimensioned and configured to extend substantially through each of the storage structures. The releasable maintaining means can further comprise a plurality of pivoting latch members each associated with a particular region of the lower storage structure for releasably engaging the upper storage structure so as to inhibit relative movement thereof and ensure the structural stability of the shopping cart.

In a preferred embodiment of the modular shopping cart of the subject invention, first and second upper storage structures are provided each of which are defined by a bottom panel, opposed upstanding side panels, and opposed upstanding front and rear panels. Preferably, the first upper storage structure has a volumetric capacity that is distinct from that of the second tipper storage structure, and the tubular support members are dimensioned and configured to extend through corresponding reception ports provided in the bottom panels of each of the upper storage structures to maintain them in an upright stacked configuration.

Further features of the modular material carrying vehicle of the subject invention will become more readily apparent from the following detailed description taken in conjunction with the drawings.

BRIEF DESCRIPTION OF THE DRAWINGS

In order that those skilled in the art to which this invention appertains may understand how to make and use the same, a detailed description of the construction thereof in accordance with a preferred embodiment of the subject invention will follow referring by numerals to the accompanying drawings wherein.

DETAILED DESCRIPTION OF THE PREFERRED EMBODIMENT

Figure 1:
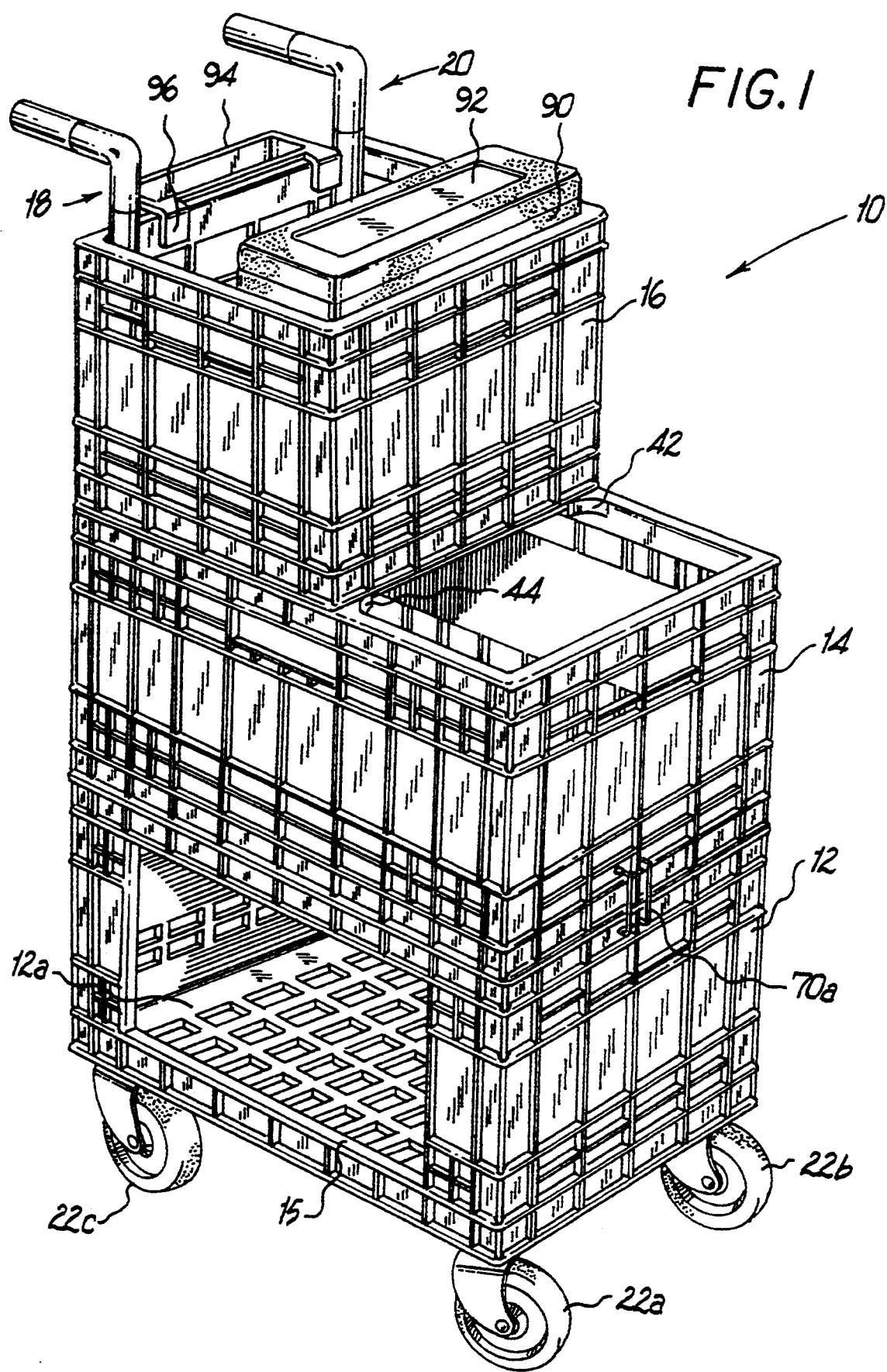
FIG. 1 is a perspective view of a modular shopping cart having separable storage compartments in accordance with a preferred embodiment of the subject invention.

The modular shopping cart of the subject invention is illustrated in FIG. 1 and is designated generally by reference numeral 10. In brief, shopping cart 10 comprises a plurality of separable modular storage compartments including a lower storage compartment 12, a central storage compartment 14, and an upper storage compartment 16. Preferably, each of the modular storage compartments of shopping cart 10 are molded from a high strength, light weight plastic material. However, other materials of construction are envisioned such as, for example, high strength fiber board or corrugated card board products. A pair of elongated tubular shafts 18 and 20 are provided for releasably maintaining each of the storage compartments in an upright stacked configuration with respect to one another. Preferably, the upper portion of each tubular shaft defines a handle area for directing the movement of the shopping cart over a supporting surface. The modular shopping cart 10 of the subject invention provides the user with a vehicle for carrying items for purchase within the supermarket, and for conveniently transporting those items from the supermarket to their home without the need for shopping bags.

Figure 2:
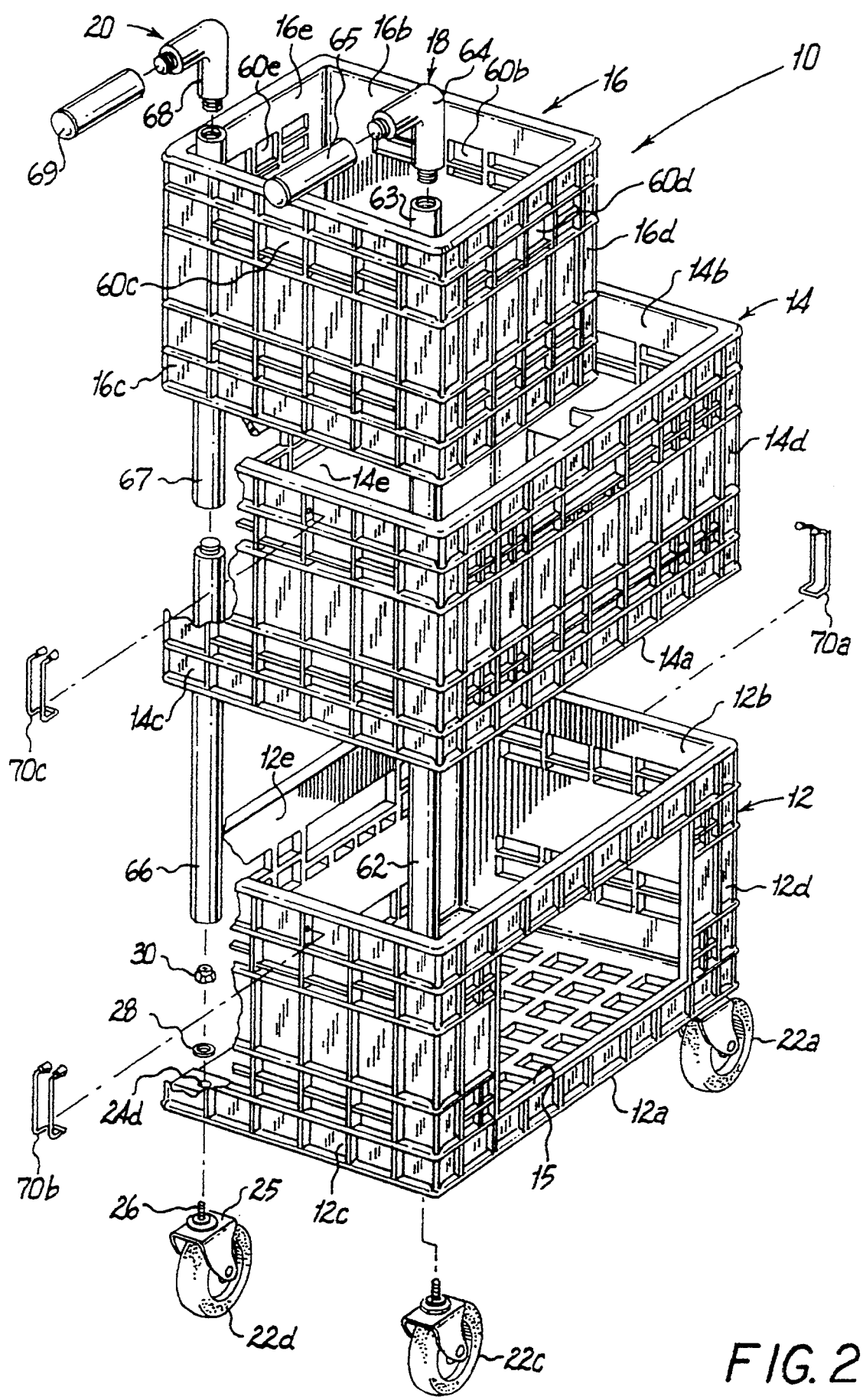
FIG. 2 is a perspective view of the modular shopping cart of FIG. 1 with parts separated for convenience of illustration.

Turning to FIG. 2, the lower storage compartment 12 of shopping cart 10 defines a substantially rectangular structure which includes a bottom panel 12a, opposed front and rear panels 12b and 12c, and opposed right and left side panels 12d and 12e. Preferably, the right side panel 12d is provided with a substantially rectangular porthole 15 dimensioned and configured for depositing items for purchase within the lower storage compartment 12. However, portholes may be provided in both of the side panels of the lower storage compartment 12 to increase accessibility thereto.

A plurality of roller bearing casters including spaced apart front casters 22a and 22b, and spaced apart rear casters 22c and 22d are mounted to the bottom panel 12a of lower storage compartment 12 for effecting movement of the shopping cart 10 over a supporting surface. As best seen in FIG. 2, each of the casters are mounted through a respective reception port, i.e., reception port 24d which is formed in the bottom panel 12a of lower storage compartment 12 adjacent the rear wall 12c thereof. The corner regions of bottom panel 12a, adjacent each of the reception ports 24 in which the casters are mounted, are substantially reinforced to ensure the structural integrity of shopping cart 10 under maximum loading conditions. Each of the casters preferably comprise a mounting assembly which includes an axle casing 25, a threaded bolt 26 extending integrally from the axle easing 25 and dimensioned for extension through a respective reception port 24, an annular washer member 28, and a nut 30 for fastening the caster to the bottom panel 12a of lower storage compartment 12. The casters may either be mounted for rotation about an axis perpendicular to the bottom panel 12a of lower storage compartment 12, or in the alternative the spaced apart rear casters 22c and 22d may be fixed from rotation for improved directional stability over a supporting surface.

Figure 5:
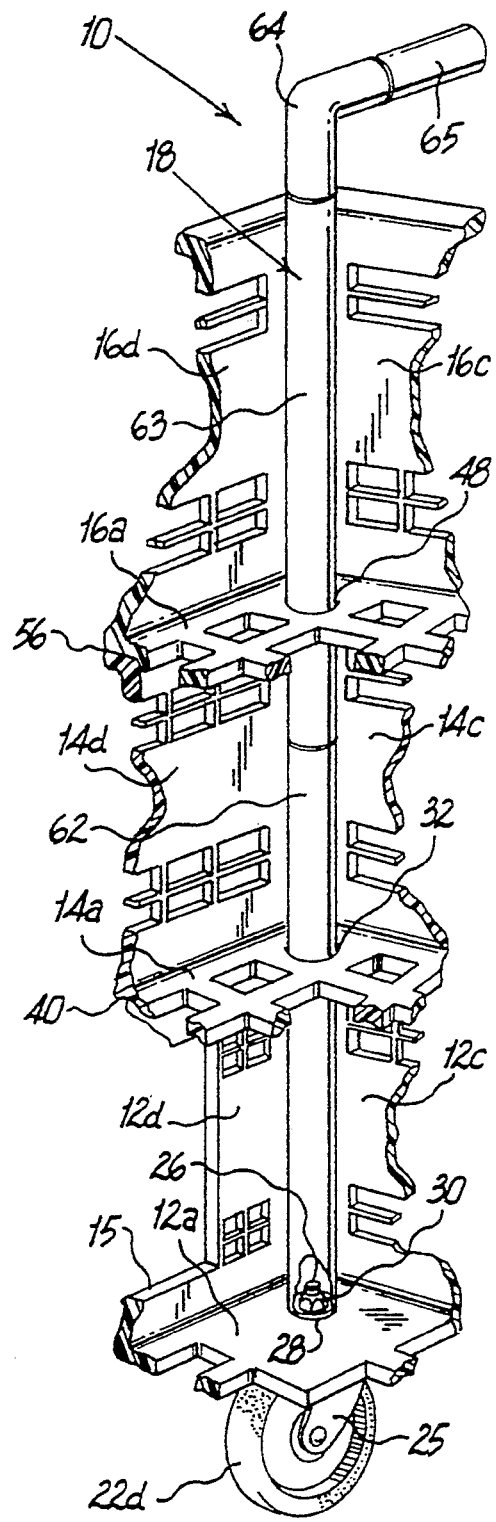
FIG. 5 is a perspective view, in cross-section, of the modular shopping cart of FIG. 1, illustrating the releasable interconnection of each of the storage compartments thereof.

The central storage compartment 14 of modular shopping cart 10 also defines a substantially rectangular structure which includes a bottom panel 14a, opposed front and rear panels 14b and 14c, and opposed right and left side panels 14d and 14e. As best seen in FIG. 5, circular reception apertures, i.e. aperture 32, extend through the bottom panel 14a of central storage compartment 14, preferably adjacent the rear wall 14b thereof, through which the elongated tubular shafts 18 and 20 respectively extend for maintaining the central storage compartment 14 and the lower storage compartment 12 in an upright stacked configuration. The orientation of the circular reception apertures can vary as can the number of reception apertures defined in the lower panel 14a of central storage compartment 14. In a preferred embodiment of the subject invention, the central storage compartment 14 and the lower storage compartment 12 are of substantially similar volumetric capacity.

A lip 40 is defined in the bottom panel 14a of central storage compartment 14, extending about the entire periphery thereof, to facilitate nested engagement of the central storage compartment 14 within the lower storage compartment 12 of shopping cart 10 (see FIG. 5). Preferably, a pair of buttresses 42 and 44 extend inwardly from the opposed right and left side panels 14d and 14e of central storage compartment 14 adjacent the top edge thereof for maintaining the upper storage compartment 16 in a desired position with respect to the central storage compartment 14 (see FIG. 1). Buttresses 42 and 44 will be discussed in greater detail hereinbelow.

The upper storage compartment 16 of the modular shopping cart 10 of the subject invention defines a substantially cubic structure which includes a bottom panel 16a, opposed front and rear panels 16b and 16c, and opposed right and left side panels 16d and 16e. The bottom panel 16a of tipper storage compartment 16 includes a pair of spaced apart apertures, i.e. aperture 48, through which tubular shafts 18 and 20 respectively extend for maintaining each of the modular storage compartments 12, 14, and 16 in an upright stacked relationship (see FIG. 5). Preferably, the volumetric capacity of the upper storage compartment 16 is distinct from that of either the central storage compartment 14 or the lower storage compartment 12. A lip 56 is defined in the bottom panel 16a of upper storage compartment 16, extending about the entire periphery thereof, for permitting nested engagement of the upper storage compartment 16 within the central storage compartment 14 (see FIG. 5).

Figure 3:
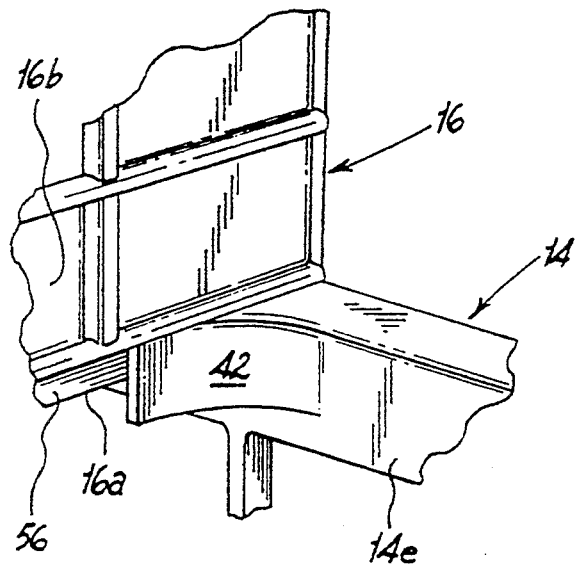
FIG. 3 is an enlarged perspective view of a lateral buttress associated with a side wall of the central storage compartment of the modular shopping cart of FIG. 1.

Furthermore, with reference to FIG. 3, the inwardly extending buttresses 42 and 44 which are provided on the opposed side panels 14d and 14e, respectively, of central storage compartment 14 engage beneath the lip 56 of bottom panel 16a to inhibit any forward movement of the upper storage compartment 16 with respect to the central storage compartment 14. Buttresses 42 and 44 are preferably integrally formed with the central storage compartment 14, although it is envisioned that the buttresses could be removably fastened to the side panels of the central storage compartment 14. By positioning the upper storage compartment 16 so that the rear panel 16c thereof is in alignment with the rear wall 14c of the central storage compartment 14, an unobstructed entryway is maintained for depositing items for purchase within the central storage compartment 14.

Alternative structures are envisioned to align an upper storage compartment with respect to the central storage compartment 14 of shopping cart 10. For example, a plurality of juxtaposed detents can be disposed in spaced relationship along the top edge of the opposed side panels of central storage compartment 14 to engage the lip in the bottom panel of one or more upper storage compartments of differing dimensions to further increase the modularity of the shopping cart of the subject invention.

As shown in FIG. 1, grasping areas are defined in the structural walls of each of the storage compartments 12, 14, and 16 to facilitate the lifting and transporting of the separable compartments of the modular shopping cart 10 to and from the supermarket, thus alleviating the need for store-owned shopping carts and plastic, canvas, or paper shopping bags. For example, as shown in FIG. 2, upper storage compartment 16 includes handle areas 60b-60e defined respectively in each of the side walls 16b-16e thereof. Similarly disposed handle areas are provided in the central storage compartment 14 as well as the lower storage compartment 12 to facilitate the transportation thereof.

Referring to FIGS. 2 and 5, each of the tubular shaft members 18 and 20 are defined by four threadably associated sections, the separation of which facilitates convenient storage in the trunk of a car or a closet when the shopping cart 10 is not in use. For example, tubular shaft 18 includes a lower section 62, a central section 63, a right-angled section 64, and a depending handle section 65 which extends orthogonal to the longitudinal axis defined by of the tubular shaft 18 to define an area to direct the movement of the cart. Similarly, tubular shaft 20 includes a lower section 66, a central section 67, a right-angled section 68, and a depending handle section 69. The respective lower sections 62 and 66 of tubular shafts 18 and 20 are hollow to facilitate seated engagement of the tubular shafts 18 and 20 upon a respective one of the rear caster mounting assemblies as illustrated in FIG. 5.

Figure 4:
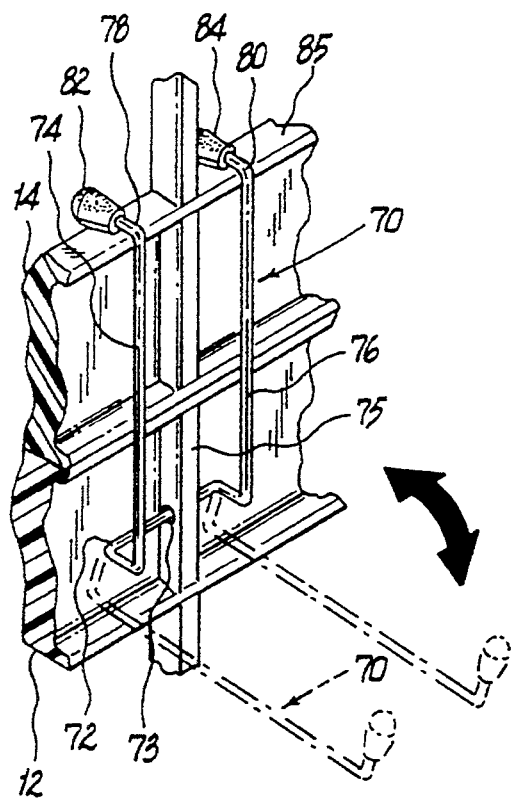
FIG. 4 is an enlarged perspective view of a pivoting latch clip associated with each of the storage compartment of the modular shopping cart of the subject invention.

Referring to FIGS. 2 and 4, the modular shopping cart 10 of the subject invention further includes a plurality of pivoting latch members 70a–70c which are associated with the storage compartments 12, 14, and 16 to ensure the structural stability and stacked configuration of the shopping cart 10 during use, while enabling easy separation thereof for transport to and from the supermarket. Each of the latch members 70a–70c are substantially U-shaped in configuration, and define an axle 72 which is pivotably mounted through an aperture 73 extending through a structural rib area 75 formed in the wall of a storage compartment. A pair of opposed legs 74 and 76 depend from the axle 72 and include respective engaging feet 78 and 80. Elastomeric end stops 82 and 84 are provided on engaging feet 78 and 80, respectively, for effectuating frictional engagement with a ledge area 85 formed in the wall of an adjacent storage compartment. In particular, with reference to FIG. 2, a forward latch member 70a is associated with the front panel 12b of lower storage compartment 12 and the front panel 14b of central storage compartment 14. A second clip 70b is associated with the rear panel 12c of lower storage compartment 12 and the rear panel 14c of central storage compartment 14. A third latch clip 70c is associated with the rear wall 14c of central storage compartment 14 and the rear wall 16c of upper storage compartment 16. Each clip 70a–70c is adapted to pivot out of frictional locking engagement to facilitate separation of the modular compartments of the shopping cart 10.

Turning again to FIG. 1, the modular shopping cart 10 of the subject invention can be provided with several additional components including a cold storage compartment 90 adapted to be removably positioned within the tipper storage compartment 16 adjacent the front panel 16b thereof. The cold storage compartment 90 has a removable hood 92 and provides an insulated enclosure for frozen foods, thus alleviating the need for separate frozen food bags. Preferably, cold storage compartment 90 is fabricated from a transparent thermoplastic material such as, for example, polyurethane, so that items will not be secreted therein. In addition, a removable coupon holder 94 can be provided for retaining a plurality of coupons or the personal belongings of the shopper. Coupon holder 94 includes an integral overhang 96 for mounting the coupon holder 94 adjacent the rear panel 16c of upper storage compartment 16.

Figure 6:
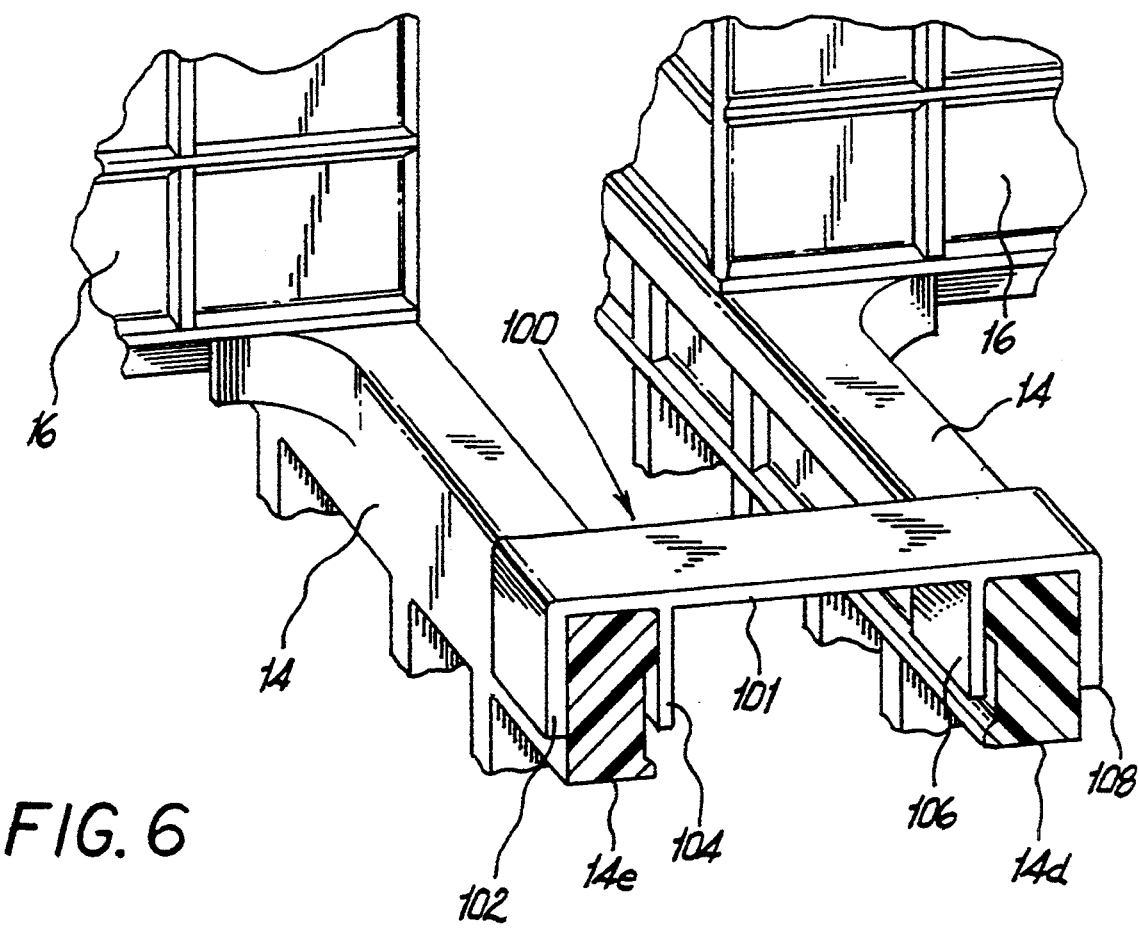
FIG. 6 is a perspective view of a bracket for releasably interconnecting two of the modular shopping carts of FIG. 1 in side-by-side spaced relationship.

Referring now to FIG. 6, the subject invention also provides an additional component for interconnecting two of the modular shopping carts described hereinabove in side-by-side tandem relationship. This interconnection feature comprises at least one bracket member 100 dimensioned and configured to engage adjacent side walls of two spaced apart shopping cans 10. Bracket 100 includes an elongated bridge portion 101 from which depends two sets of spaced apart engaging legs 102 and 104, and 106 and 108. Preferably, a first bracket 100 will lock together the respective side walls 14e and 14d of adjacent central storage compartments 14, and a second bracket 100 will lock together respective side walls 16e and 16d of adjacent upper storage compartments 16. Bracket 100 is dimensioned and configured to provide adequate spacing between the two shopping cans to ensure that the wheels of each cart have a sufficient area to operate within, and to provide access to the porthole 15 in the lower compartment of each shopping cart. Placement of each of the brackets may vary, however, it is preferred that at least one bracket be disposed adjacent the buttress area of the central storage compartment 14 for added stability.

The modular shopping cart 10 of the subject invention may also include a plurality of planar insert panels configured and dimensioned in such a manner so as to subdivide and compartmentalize any of the storage compartments. These insert panels could be easily installed and removed to further increase the modularity of the shopping cart of the subject invention.

The modular shopping cart 10 of the subject invention may be easily and quickly assembled for utilization. To assemble the modular shopping cart 10, the central storage compartment 14 is stacked upon the lower storage compartment 12, followed by the placement of the upper storage compartment 16 upon the central storage compartment 14 in such a manner so that the buttresses 42 and 44 are positioned beneath the lip 56 defined in the bottom panel 16a thereof. Thereafter, each of the sections of tubular shafts 18 and 20 are threadably assembled, and the shafts are extended through the apertures defined in the bottom panels of each of the tipper and central storage compartments. Subsequently, each of the latch clips 70a–70c may be pivoted into locked positions whereupon the modular shopping cart 10 of the subject invention is prepared for use. Disassembly after use can be accomplished by unlatching clips 70a–70c, removing shaft members 18 and 20, and lifting each of the storage compartments by means of the handle areas provided therein.

While the modular shopping cart of the subject invention has been described with respect to a preferred embodiment, it is apparent that changes or modifications may be made thereto without departing from the spirit or scope of the invention as defined by the appended claims. For example, the size of the storage compartments can vary as well as the configuration in which they are stacked with respect to one another. It is also envisioned that the vehicle may be configured as an expandable single compartment cart for transporting relatively large items. In this instance, only the lower storage compartment would include a bottom panel, while any storage structure stacked upon the bottom compartment would have only front and rear panels and opposed side panels.

What is claimed is:

1. A modular shopping cart comprising:
    a) a lower storage structure defining a bottom panel and at least two parallel upstanding panels;
    b) means associated with said bottom panel of said lower storage structure for effectuating movement of said shopping cart over a supporting surface;
    c) at least one upper storage structure defining a bottom panel, opposed upstanding side panels, and opposed upstanding front and rear panels stackable upon said lower storage structure; and
    d) means for releasably maintaining said lower storage structure and said at least one upper storage structure in an upright stacked configuration including a pair of tubular support members dimensioned and configured to extend through each of said storage structures, each of said tubular support members having a plurality of interconnected tubular sections including at least one elongated section and at least one transverse section defining handle means for directing movement of said shopping cart.

2. A modular shopping cart as recited in claim 1, wherein said means for releasably maintaining said storage structures in an upright stacked configuration further comprises a plurality of releasable latch members.

3. A modular shopping can as recited in claim 1, wherein said means for effectuating movement of said shopping cart comprises a plurality of casters mounted to said bottom panel of said lower storage structure.

4. A modular shopping can as recited in claim 1, wherein said shopping can comprises first and second upper storage structures, said first upper storage structure having a volumetric capacity distinct from that of said second upper storage structure.

5. A modular shopping cart as recited in claim 1, further comprising means for releasably interconnecting two of said shopping carts in side-by-side spaced relationship.

6. A modular shopping cart as recited in claim 5, wherein said means for releasably interconnecting two of said shopping carts comprises at least one bracket member dimensioned and configured to engage adjacent side panels of said shopping carts.

7. A modular shopping cart comprising:
    a) a lower storage structure defining a bottom panel and at least two parallel upstanding panels;
    b) means associated with said bottom panel of said lower storage structure for effectuating movement of said shopping cart over a supporting surface;
    c) a central storage structure defining a bottom panel, opposed upstanding side panels, and opposed upstanding front and rear panels stackable upon said lower storage structure;
    d) an upper storage structure defining a bottom panel, opposed upstanding side panels, and opposed upstanding front and rear panels stackable upon said central storage structure; and
    e) means for releasably maintaining each of said lower, central and upper storage structures in an upright stacked configuration including a pair of tubular support members dimensioned and configured to extend through each of said storage structures, each of said tubular support members having a plurality of interconnected tubular sections including at least one elongated section and at least one transverse section defining handle means for directing movement of said shopping cart.

8. A modular shopping cart as recited in claim 7, wherein said means for releasably maintaining said storage structures in an upright stacked configuration further comprises a plurality of releasable latch members configured to inhibit relative movement of each of said support structures.

9. A modular shopping cart as recited in claim 7, wherein said means for effectuating movement of said shopping cart comprises a plurality of rolling casters mounted to said bottom panel of said lower storage structure.

10. A modular shopping cart as recited in claim 7, wherein said upper storage structure has a volumetric capacity distinct from that of said central storage structure defining a stepped arrangement in said upright stacked configuration.

11. A modular shopping cart as recited in claim 7, further comprising means for releasably interconnecting two of said shopping carts in side-by-side spaced relationship.

12. A modular material carrying vehicle comprising:
    a) a lower storage structure defining a bottom panel, opposed upstanding side panels, and opposed upstanding front and rear panels;
    b) means associated with said bottom panel of said lower storage structure for effectuating movement of said vehicle over a supporting surface;
    c) at least one upper storage structure stackable upon said lower storage structure and defining opposed upstanding side panels, and opposed upstanding front and rear panels; and
    d) means for releasably maintaining said lower storage structure and said at least one upper storage structure in an upright stacked configuration including a pair of tubular support members dimensioned and configured to extend through each of said storage structures, each of said tubular support members having a plurality of interconnected tubular sections including at least one elongated section and at least one transverse section defining handle means for directing movement of said vehicle.

13. A modular vehicle as recited in claim 12, wherein said means for releasably maintaining said storage structures in an upright stacked configuration further comprises a plurality of releasable latch members configured to inhibit relative movement of each of said support structures.

14. A modular vehicle as recited in claim 12, wherein said means for effectuating movement of said shopping cart comprises a plurality of rolling casters mounted to said bottom panel of said lower storage structure.

* * * * *